United States Patent [19]

Zajac

[11] Patent Number: 4,591,199
[45] Date of Patent: May 27, 1986

[54] DEVICE FOR GRIPPING WORKPIECES

[75] Inventor: Theodore S. Zajac, Bay Village, Ohio

[73] Assignee: Zaytran Inc., Elyria, Ohio

[21] Appl. No.: 613,576

[22] Filed: May 24, 1984

[51] Int. Cl.⁴ .............................................. B66C 1/44
[52] U.S. Cl. ..................................... 794/88; 294/116; 269/32
[58] Field of Search ............... 294/88, 86.25, 86.3, 294/115, 116, 87.1, 103.1; 414/745, 741, 736, 729, 740, 751, 738; 269/25, 30, 32, 34, 213, 234

[56] References Cited

U.S. PATENT DOCUMENTS

| | | | |
|---|---|---|---|
| 2,679,177 | 5/1954 | Gepfert | 81/17.2 |
| 3,727,772 | 4/1973 | Pauls | 214/1 P |
| 3,899,162 | 8/1975 | Fischer | 269/25 |
| 4,244,618 | 1/1981 | Boyer et al. | 294/88 |
| 4,336,926 | 6/1982 | Inagaki et al. | 414/744 |

OTHER PUBLICATIONS

Vises-Catalogue of the Company Heinrich Tools Inc., Grippers-Catalogue of the Company "phd, Inc.".

*Primary Examiner*—James B. Marbert
*Attorney, Agent, or Firm*—Yount & Tarolli

[57] ABSTRACT

A device for moving gripping jaws into engagement with a workpiece comprising two coaxial fluid cylinders for moving the jaws. A piston fixedly connected with a gripping jaw moves in each of the cylinders. Fluid pressure is applied to opposite sides of the pistons to effect movement of the pistons away and toward each other to thereby move the jaws away and toward each other. A means is provided to insure synchronous movement of the two pistons. The means comprises a rod extending along the axis of the two cylinders. The pistons and the rod have a driving interconnection. The driving interconnection effects rotation of the rod in opposite directions upon movement of the pistons away and toward each other. A bearing assembly located between the two fluid cylinders supports the rod for rotation.

16 Claims, 4 Drawing Figures

DEVICE FOR GRIPPING WORKPIECES

BACKGROUND OF THE INVENTION

The present invention relates to a device for moving members into engagement with a workpiece to engage the workpiece. In particular, the present invention relates to a device for moving workpiece gripping jaws toward and away from each other.

Devices for moving members into engagement with a workpiece are used in many types of material handling equipment and are used in robotics. It is important in operation of such devices that the jaws or other workpiece engaging elements move synchronously. It is also important that the devices be light in weight and efficient in operation.

Devices which provide synchronized movement of jaw members are known. In many of the known devices, each jaw member is associated with a rack, and the two racks engage a common pinion so that the two jaws must move in unison. Such a device is shown, for example, in U.S. Pat. No. 2,679,177. Such devices are relatively heavy and cumbersome.

Another type of device for moving jaws in a synchronized manner is shown in U.S. Pat. No. 3,899,162. This patent discloses jaw moving members which have faces which engage a synchronization member. The synchronization member is movable in a direction at a right angle to the direction of movement of the jaws. When the jaws move toward each other, the jaws contact the synchronization member and move the member against the resistance of a spring. The synchronization member insures that the jaws move toward each other in a synchronous manner. In such a device, friction forces are created acting transverse to the direction of jaw movement. These friction forces must be overcome by the fluid cylinders which move the jaws. This device, also, requires a number of elements (synchronization member, two cylinders, a spring). Thus, such a device is also relatively heavy.

Another means for effecting synchronization of jaw movement is shown in U.S. Pat. No. 3,727,772. In this patent, two double-acting cylinders move jaw members. In this structure the pistons are stationary and the cylinders move. The cylinders move along two parallel feed screws arranged symmetrically with respect to an axis common to both cylinders. The screws have oppositely inclined mirror symmetrical threads meshing with internal threads provided on nuts located in each cylinder body. Upon axial movement of the cylinders, the screws rotate. This insures synchronized movement of the jaws. The structure of U.S. Pat. No. 3,727,772 is rather complicated and because of the number of parts is cumbersome to manufacture and is not light in weight.

SUMMARY OF THE INVENTION

The present invention provides a device for moving workpiece engaging members such as gripping jaws toward and away from each other. The device includes a housing having a chamber defining two coaxial cylinder bores. The workpiece engaging members are moved by two pistons located in the coaxial cylinder bores. A gripping jaw is connected with each of the pistons. Fluid pressure is directed to opposite sides of the pistons to effect movement thereof in the coaxial bores and movement of the jaws.

The device includes means for insuring synchronous movement of the pistons. Specifically, a rod is arranged along the common axis of the cylinder bores and is coaxial with the cylinder bores. Each piston has a cylindrical cavity formed therein. The rod has two outer end portions located in the respective cylindrical cavities of the pistons. A driving interconnection is provided between the pistons and the respective end portions of the rod. The driving interconnection between the piston and the rod effects rotation of the rod in one direction when the pistons move away from each other, and in the reverse direction when the pistons move toward each other. Two mirror symmetrical cam means are arranged between the pistons and the respective outer end portions of the rod. The two cam means provide for rotation of the rod when the pistons move. The rod is supported for rotation by a single bearing assembly located between the pistons. The rod insures that the pistons move synchronously, and therefore, that the two jaws connected therewith move synchronously.

The single bearing assembly includes a bearing support block which supports the rod for rotation. The bearing support block is located in the housing defining the cylinder bores. The bearing support block is located between the two axially aligned cylinder bores. The housing itself may comprise two or more housing portions which are fastened together.

The cam means which effects rotation of the rod may take a variety of different constructions. Preferably, it comprises cooperating oppositely inclined symmetrical helical splines and spline grooves formed in the interior of the piston and on the exterior of the rod. The spline grooves define cam surfaces acting as cams, and the splines serve as cam followers. Alternatively, it may comprise right/lefthand female threads formed in each piston interior and respective male threads on the rod exteriors meshing therewith to provide a camming action.

Accordingly, a device of the present invention is simple, easy to manufacture and assemble and, at the same time, insures synchronization of movement of the two jaws. Also, the device is efficient in operation and light in weight.

The efficiency of operation is achieved by the fact that fluid forces act on the jaw moving pistons in the direction of jaw movement. Further, there is no substantial friction loss due to the functioning of the synchronization means. The light weight is a result of many features of the device including the use of a single bearing supporting the rod which provides synchronization, hollow pistons, and the structural arrangement of the parts defining the fluid chambers.

BRIEF DESCRIPTION OF THE DRAWINGS

Other features of the invention will be readily apparent from reading the following specification with reference to the accompanying drawings that illustrate presently preferred embodiments of the invention and wherein.

DESCRIPTION OF PREFERRED EMBODIMENTS

Figure 1:
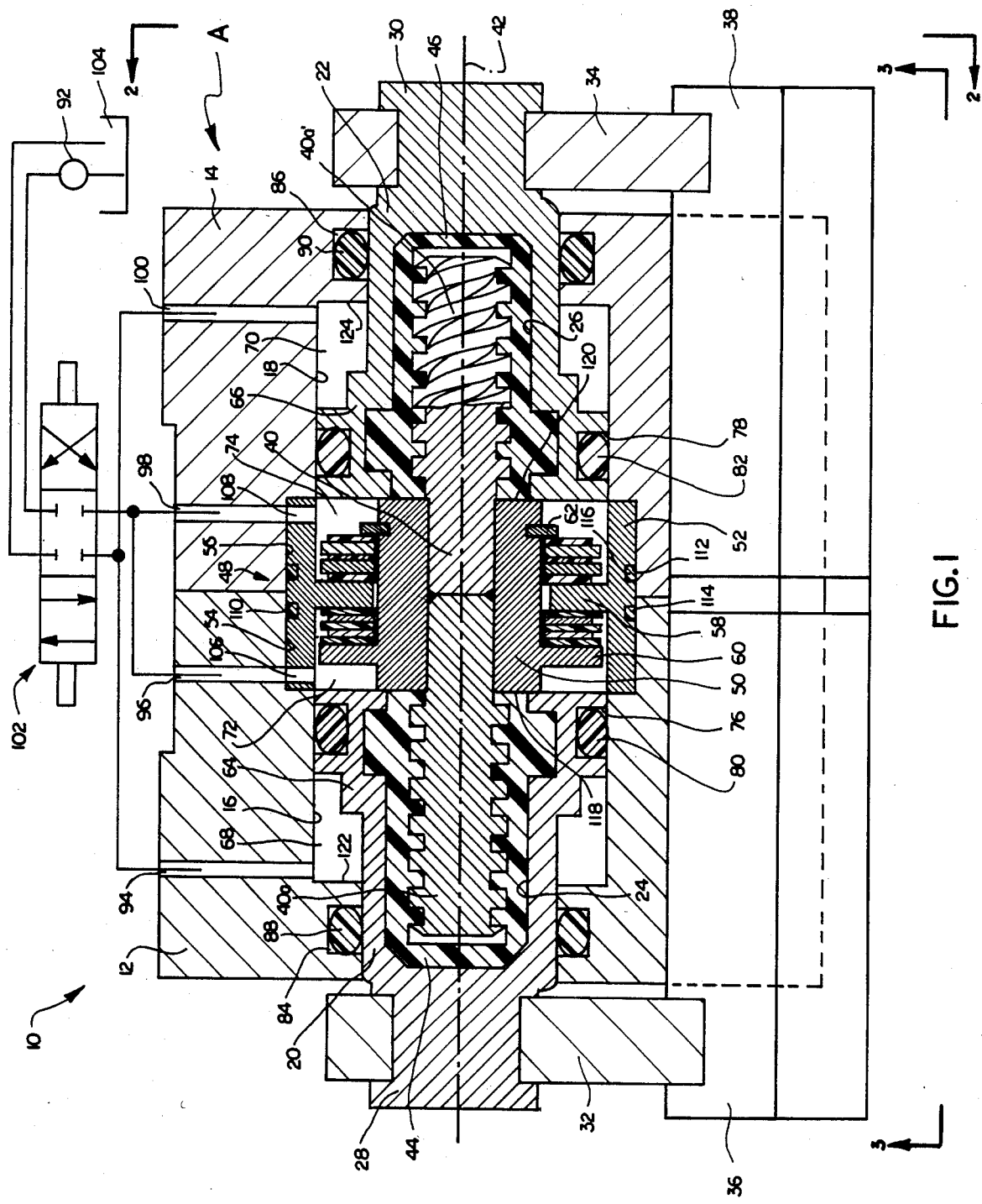
FIG. 1 is a sectional view of a device embodying the present invention.

A preferred embodiment of the present invention is illustrated in FIG. 1. The device shown in FIG. 1 is designated A. The device A includes a housing 10 that comprises two housing portions 12 and 14 which define a chamber comprised of two coaxial bores 16 and 18, respectively. The two housing portions 12, 14 may be connected by suitable fasteners such as bolts (not shown) or otherwise.

Pistons 20, 22, preferably made of aluminum are located in each respective bore 16, 18. The pistons 20, 22 have cylindrical cavities 24, 26, respectively, therein.

Figure 3:
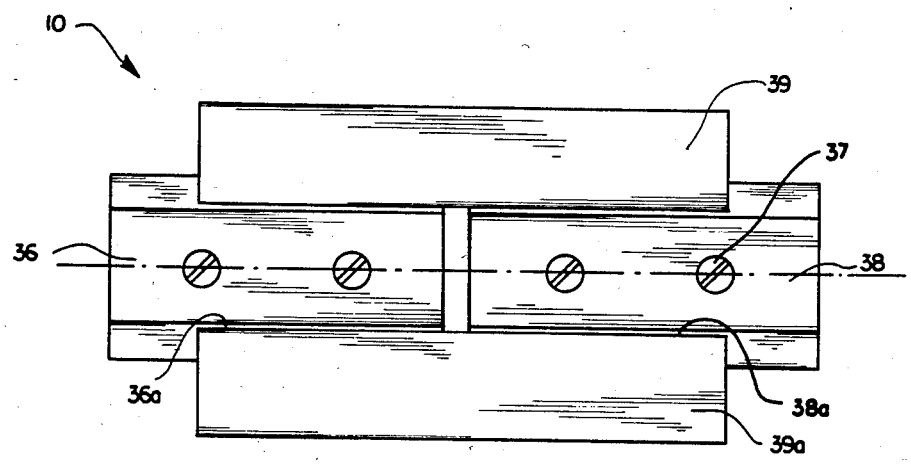
FIG. 3 is a bottom view of the device of FIG. 1 looking at the device of FIG. 1 as indicated by the line 3—3 in FIG. 1.

The pistons 20, 22 have outer portions 28, 30, respectively, that project beyond the housing portions 12, 14. The outer portions 28, 30 are fixedly connected with arms 32, 34 which in turn are fixedly connected with slides 36, 38. The piston portions 28, 30 are fixed to the arms 32, 34, preferably by pins. The workpiece engaging members (not shown) are adapted to be fastened on the slides 36, 38 by screws 37 shown in FIG. 3.

Figure 2:
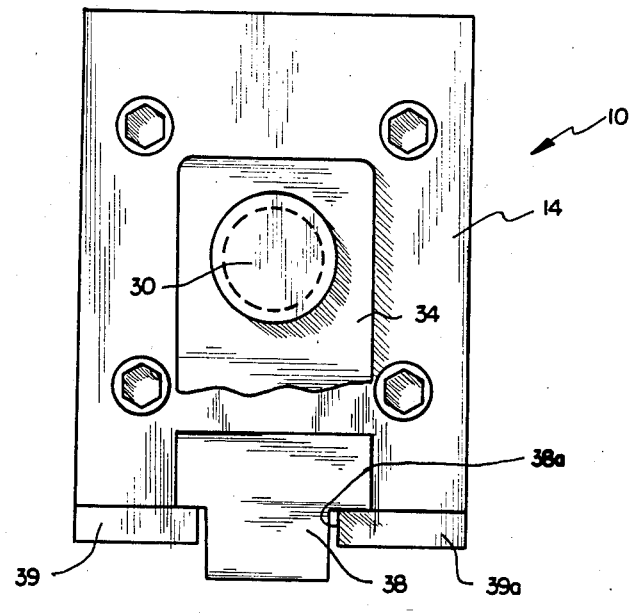
FIG. 2 is a side view of the device of FIG. 1 looking at the device as indicated by the line 2—2 in FIG. 1.

The slides 36, 38 preferably have a T-shaped cross section as shown in FIG. 2, and they move in slideways 36a, 38a. The slideways 36a 38a are defined by recesses in the housing portions 12, 14 and plates 39, 39a. The plates 39, 39a a are suitably secured to the housing portions 12, 14. When the pistons 20, 22 move away from each other, the slides 36, 38 move in the same direction and away from each other. When the pistons move toward each other the slides 36, 38 move toward each other. Accordingly, movement of pistons 20, 22 toward and away from each other provide for respective movement of the slides 36, 38 so that the jaws carried on the slides 36, 38 grip and release a workpiece.

The device A includes means for insuring synchronous movement of the pistons 20, 22 and thereby synchronous movement of the slides 36, 38 and the jaws. This means includes a rod 40 arranged along the common axis 42 of the two bores 16, 18. The rod 40 preferably, consists of two parts 40a, 40a' welded, glued, or otherwise connected to each other to form an integral rod. Means are provided to rotate the rod 40 upon axial movement of the two pistons. This means includes two nylon nuts 44, 46 having symmetrical oppositely inclined righthand and lefthand threads. The nuts 44, 46 are molded into the two pistons 20, 22, respectively. The rod parts 40a, 40a' are provided with respective righthand and lefthand male threads. Engagement between the nuts 44, 46 and the respective rod parts 40a, 40a' provides a driving interconnection between the pistons 20, 22 and the rod 40 that effects rotation of the rod upon axial movement of the pistons 20 and 22.

A bearing assembly 48 is located in the center of the housing formed by the housing portions 12, 14 and supports the rod 40 for rotation about the axis 42. The bearing assembly 48 comprises a bearing sleeve 50 that encircles the central unthreaded portion of the rod 40 and is press fit thereon. The bearing sleeve 50 cooperates with another sleeve 52. The sleeve 52 is located in aligned inner recesses 54, 56, respectively, in the housing portions 12, 14.

The sleeve 52 has a central circular rib 58 projecting radially toward the rod 40. The rib 58 is axially spaced from a flange 60 projecting radially outwardly from the sleeve 50 at one end thereof. A retainer ring 62 is located in an annular groove in the sleeve 50 located near the other end of the sleeve 50. Shims and spacers are located in the space between the rib 58 and the flange 60 and between the rib 58 and the retainer ring 62. In this manner, the axial position of the sleeve 50 and thus the rod 40 can be established. Also, the opposite radially extending surfaces of the rib 58 are covered with antifriction material and thus provide for rotation of the sleeve 50 and rod 40 relative to the sleeve 52.

Each of the pistons 20, 22 has a head portion 64, 66, respectively, that slidably engage the walls defining the respective bores 16, 18. The walls of the bores 16, 18 and the piston head portions 64, 66 define outer fluid chambers 68, 70, respectively, and the piston head portions, and the bearing assembly 48 define inner fluid chambers 72, 74.

The head portions 64, 66 each has an outer annular groove 76, 78 that receives a seal ring 80, 82 for preventing leakage between the respective outer and inner chambers. Each of the housing portions 12, 14 has next to its bore 16, 18 and outside thereof an inner annular groove 84, 86 that receives another sealing ring 88, 90, respectively. The sealing rings 88, 90 prevent leakage of the fluid from the housing.

A fluid pump 92 supplies fluid to the respective chambers. Each housing portion 12, 14 has two channels 94, 96 and 98, 100, respectively, that communicate fluid to and from the respective chambers. A control valve 102 controls fluid flow from the pump 92 to the respective inner or outer chambers, and from the others of the chambers to a reservoir 104.

The outer sleeve 52 of the bearing assembly has two channels 106, 108 that communicate fluid between channels 96, 98 and inner fluid chambers 72 and 74. The sleeve 52 has two annular grooves 110, 112 on the outer surface thereof which are located on opposite sides of the center of the sleeve 52. Seal rings 114, 116 are located in these grooves and prevent fluid leakage from chambers 72, 74 between the housing portions 12, 14 to atmosphere.

It is clear that such a device can be easily manufactured and assembled. Each part of the device can be easily produced by conventional methods. Assembling and disassembling of the device for servicing or replacement of parts, if needed, is also easy. The device is light in weight. This results in part from the structural arrangement of the housing parts which define the fluid chambers and the single bearing assembly located between the pistons.

The device of the invention operates as follows. The position shown in FIG. 1 corresponds to the position of the parts when a workpiece is being engaged. To release the workpiece, the control valve 102 is actuated, and fluid pressure is supplied into chambers 72, 74 through respective channels 96, 106 and 98, 108 from the pump 92. The pistons 20, 22 move away from each other. The pistons 20, 22 will move until they engage surfaces 122, 124 on the housing portions 12, 14. The slides 36, 38 also move away from each. Accordingly, a workpiece held by the jaws (not shown) fixedly mounted on the slides 36, 38 is released. Fluid from chambers 68, 70 is evacuated through other conduits 94, 100 to the reservoir 104.

When a next workpiece is to be engaged, fluid is directed into chambers 68, 70, and the pistons 20, 22 move the jaws toward each other so that the jaws engage the workpiece. The pistons 20, 22 will move until they engage respective surfaces 118, 120 of the sleeve 50. The stroke of movement of the pistons 20, 22 is determined by the distance between end faces 118, 120 of the bearing assembly 48 and surfaces 122, 129 of the housing portions that define the coaxial bores 16, 18, respectively, and by the width of piston heads 64, 66.

Since the nuts 44, 46 are rigidly connected with the respective pistons 20, 22 and since the nuts mesh with threads on portions 40a, 40b of the rod 40, the rod rotates in response to the axial movement of the pistons 20, 22. The rod 40 rotates counterclockwise as the pistons 20, 22 move away from each other, and the rod 40 rotates clockwise as the pistons 20, 22 move toward each other. This insures that the pistons move at the same rate. If one of the pistons 20, 22 tends to move at a slower rate (e.g., it sticks for some reason) than the other, the meshing threads of the nut located in the other piston and the respective end portion of the rod 40 would apply a braking effect on the movement of the other piston. Thus, the rod 40 synchronizes the movement of the two pistons 20, 22.

Figure 4:
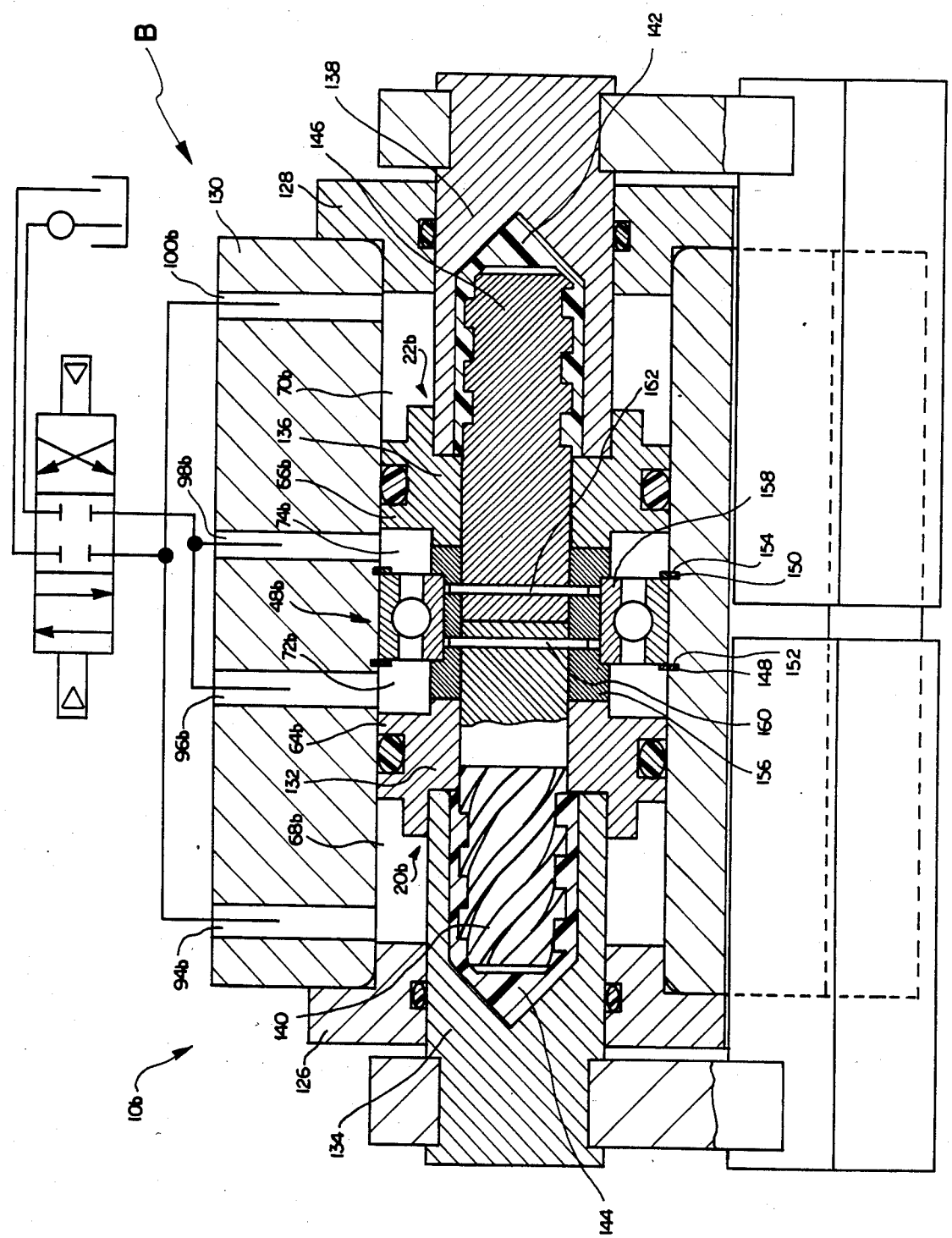
FIG. 4 is a sectional view of another embodiment of a device embodying the invention.

Another embodiment of the device according to the present invention is shown in FIG. 4. The device shown in FIG. 4 is designated B, and like elements are designated by the same reference numerals as in FIG. 1 but with a suffix "b". In this embodiment, the housing 10b consists not of two but of three parts including two end plates 126, 128 and a housing sleeve 130 arranged between the end plates 126, 128 are fixed to the sleeve. Each of the pistons 20b, 22b consists of two parts including rings 132, 136 and cylindrical portions 134 and 138, respectively. The head portions 64b, 66b of rings 126, 130 have the same configuration as the head portions 64, 66 of pistons 20, 22 in FIG. 1. Channels 94b-100b for directing fluid flow to and from chambers 68b-74b are formed in the housing sleeve 130.

In the embodiment shown in FIG. 4, the rotation of the rod 40b is effected by spline connections between opposite end portions 134, 136 of the rod 40b and the respective pistons 20b, 22b. Two nylon sleeves 144, 142 having mirror symmetrical helical spline grooves are molded into cavities of the pistons 20b, 22b, and the opposite end portions 140 and 142 are provided with mirror symmetrical helical splines.

The single bearing assembly 48b comprises a ball bearing centrally located in the chamber defined by the housing. Retainer rings 148, 150 are located in annular grooves 152, 154 provided in the housing sleeve 130. The rings 148, 150 are located between channels 96b and 98b that direct fluid to and from the inner chambers 72b, 74b. The retainer ring retain the bearing assembly 48b in axial position in the housing sleeve 130.

The sleeve 156 that supports the rod for rotation is fixed to the inner ring 158 of the bearing assembly. The sleeve 156 is fixed to two rod portions by pins (160, 162) extending through the two portions of the rod.

While the invention has been descibed herein in terms of the preferred embodiment, numerous variations may be made in the device shown in the drawings and herein described without departing from the spirit and scope of the invention as set forth in the appended claims.

What is claimed is:

1. A device for moving members into engagement with a workpiece comprising two coaxial fluid cylinders, a piston movable in each of said fluid cylinders, means for directing fluid pressure to opposite sides of said pistons to effect movement of said pistons in said fluid cylinders away from each other and toward each other, means for insuring synchronous movement of said pistons comprising rod means extending along the axis of said coaxial fluid cylinders, said rod means and pistons having a driving interconnection which effects rotation of said rod means in one direction when said pistons move away from each other and in the reverse direction when said pistons move toward each other, and a single bearing assembly between said fluid cylinders for supporting said rod means for rotation about said axis.

2. A device as set forth in claim 1 comprising housing means, said housing means and said bearing means defining together said two coaxial fluid cylinders.

3. A device as set forth in claim 1 wherein said rod means has a pair of end portions each, and rotation of said rod means in response to movement of said piston means is effected by a pair of symmetrical mirror cam means arranged between the respective pistons and end portions of said rod means.

4. A device as set forth in claim 3 wherein said pistons have cylindrical cavities axially aligned along said axis, said end portions of said rod means engaging said pistons in said cylindrical cavities, respectively, and said pair of cam means comprise symmetrical mirror cam surfaces associated with ones of said cylindrical cavities and said end portions, respectively, and cam followers associated with others of said cylindrical cavities and end portions, respectively.

5. A device as set forth in claim 4 wherein said driving interconnection between said rod means and pistons is provided by plastic nuts molded into said cavities and having righthand and lefthand female threads, respectively, and respective righthand and lefthand male threads provided on opposite end portions of said rod means.

6. A device as set forth in claim 1 wherein said rod means comprises a pair of opposite end portions, and said driving interconnection is provided by mirror symmetrical spline means arranged between a respective end portion of said rod means and a respective piston.

7. A device for moving members into engagement with a workpiece including a housing comprising at least two housing portions defining a chamber, said chamber comprising first and second coaxial cylinder bores, first and second pistons movable in said first and second cylinder bores, respectively, means for directing fluid pressure to opposite sides of said pistons to effect movement of said pistons away from each other and toward each other, said pistons having outer end portions projecting from opposite sides of said housing, and opposed workpiece engaging members connected with said outer end portions, respectively, for joint movement with said pistons, respectively, to engage or release a workpiece.

8. A device as set forth in claim 7 further comprising means for insuring synchronous movement of said pistons to and away from each other, said means comprising rod means extending along the common axis of said first and second bores, said rod means and said first and second pistons having driving interconnection therebetween that effects rotation of said rod means about said common axis in one direction when said pistons move away from each other and in reverse direction when said pistons move toward each other.

9. A device as set forth in claim 8 wherein said driving interconnection comprises mirror symmetrical cam means arranged between said first and second pistons and opposite end portions of said rod means, respectively.

10. A device as set forth in claim 9 wherein said first and second pistons each has an axial cylindrical cavity, and said mirror symmetrical cam means comprises oppositely inclined mirror symmetrical internal threads provided in said cavities of said first and second pistons and corresponding external threads provided on said opposite end portions of said rod means.

11. A device as set forth in claim 10 wherein said first and second pistons each has an axial cylindrical cavity and said cam means comprises oppositely inclined mirror symmetrical spline grooves provided in said cavities of said first and second pistons and corresponding splines provided on said opposite end portions of said rod means.

12. A device as set forth in claim 10 or 11 wherein said internal threads or spline grooves are provided in plastic nuts molded into said axial cylindrical cavities of said first and second pistons.

13. A device as set forth in claim 8 further comprising bearing means located in said housing between said first and second pistons for supporting said rod means for rotation about said axis, said bearing means defining with said housing portions said coaxial cylinder bores.

14. A device as set forth in claim 7 wherein each of said housing portions includes channels through which fluid pressure is directed to the opposite sides of said first and second pistons.

15. A device as set forth in claim 7 wherein said housing means includes two opposite end plates and a cylindrical sleeve located therebetween, said end plates and sleeve defining said chamber.

16. A device as set forth in claim 15 wherein said sleeve includes radial channels for directing fluid pressure to the opposite sides of said first and second pistons.

* * * * *